(12) United States Patent
Suyama et al.

(10) Patent No.: US 6,720,996 B1
(45) Date of Patent: Apr. 13, 2004

(54) IMAGING APPARATUS

(75) Inventors: Motohiro Suyama, Hamamatsu (JP);
Shogo Ema, Hamamatsu (JP); Tadashi Maruno, Hamamatsu (JP)

(73) Assignee: Hamamatsu Photonics K.K., Hamamatsu (JP)

( * ) Notice: Subject to any disclaimer, the term of this patent is extended or adjusted under 35 U.S.C. 154(b) by 0 days.

(21) Appl. No.: 09/600,414

(22) PCT Filed: Jan. 18, 1999

(86) PCT No.: PCT/JP99/00134
§ 371 (c)(1),
(2), (4) Date: Jul. 17, 2000

(87) PCT Pub. No.: WO99/36754
PCT Pub. Date: Jul. 22, 1999

(30) Foreign Application Priority Data

Jan. 16, 1998 (JP) .......................................... 10-006758

(51) Int. Cl.[7] ............................................. H04N 5/225
(52) U.S. Cl. ................................ 348/216.1; 348/215.1; 313/542
(58) Field of Search .......................... 348/207.99, 215.1, 348/216.1, 217.1, 284, 286, 287, 289, 293, 294, 295; 313/542, 532, 544, 531; H04N 5/225

(56) References Cited

U.S. PATENT DOCUMENTS

| | | | |
|---|---|---|---|
| 4,963,952 A | | 10/1990 | Janesick |
| 5,883,466 A | * | 3/1999 | Suyama et al. .............. 313/542 |
| 6,198,221 B1 | * | 3/2001 | Suyama et al. .............. 313/542 |
| 6,657,178 B2 | * | 12/2003 | Aebi ..................... 250/214 VT |

FOREIGN PATENT DOCUMENTS

| | | | |
|---|---|---|---|
| GB | A-2323471 | 9/1998 | |
| JP | A-58-133748 | 8/1983 | |
| JP | B2-60-30059 | 7/1985 | |
| JP | 2001-169193 | * 6/2001 | .......... H04N/5/335 |

OTHER PUBLICATIONS

George M. Williams Jr. and Alice L. Reinheimer, "Black–illuminated and electron–bombarded CCD low light level imaging system performance", SPIE, Nov. 15, 1995, pp. 208–223.
George M. Williams Jr. and Alice L. Reinheimer, "Electron–bombarded back illuminated CCD sensors for low light level imaging applications", SPIE, Apr. 14, 1995, pp. 211–235.
M. Suyama, A. Kageyama, S. Ema, K. Kinoshita and T. Maruno, "EB–CCD life characteristics", pp. 131–138, Reprinted from "Solid State Sensor Arrays: Development and Applications II", SPIE, Jan. 26–27, 1998.

* cited by examiner

Primary Examiner—Tuan Ho
(74) Attorney, Agent, or Firm—Oliff & Berridge, PLC

(57) ABSTRACT

In order to provide an imaging apparatus that uses an electron-bombarded multiplying tube with an internal solid imaging device with a long life, improved S/N ratio, high resolution, and moreover high sensitivity, an electron-bombarded multiplying tube with a photocathode 13 and a back-illuminated FT-CCD 11 sealed in a vacuum vessel is used as an imaging element. The vacuum vessel is made from a faceplate 12, a ceramic tube 16, and a ceramic stem 17. The photocathode 13 emits photo-electrons from a surface opposite from the incidence plane, in accordance with incident light. The FT-CCD 11 has an incidence plane disposed in the pathway of photo-electrons from the opposite surface. An imaging portion 11a of the FT-CCD 11 has pixels in the vertical direction in the same number as or in greater numbers than the number of output scan lines. A transfer electrode of the imaging portion 11a is constantly applied with a negative voltage during an image accumulation period. By this, dark current can be controlled, the S/N ratio can be improved, resolution can be maintained, and sensitivity can be improved.

5 Claims, 7 Drawing Sheets

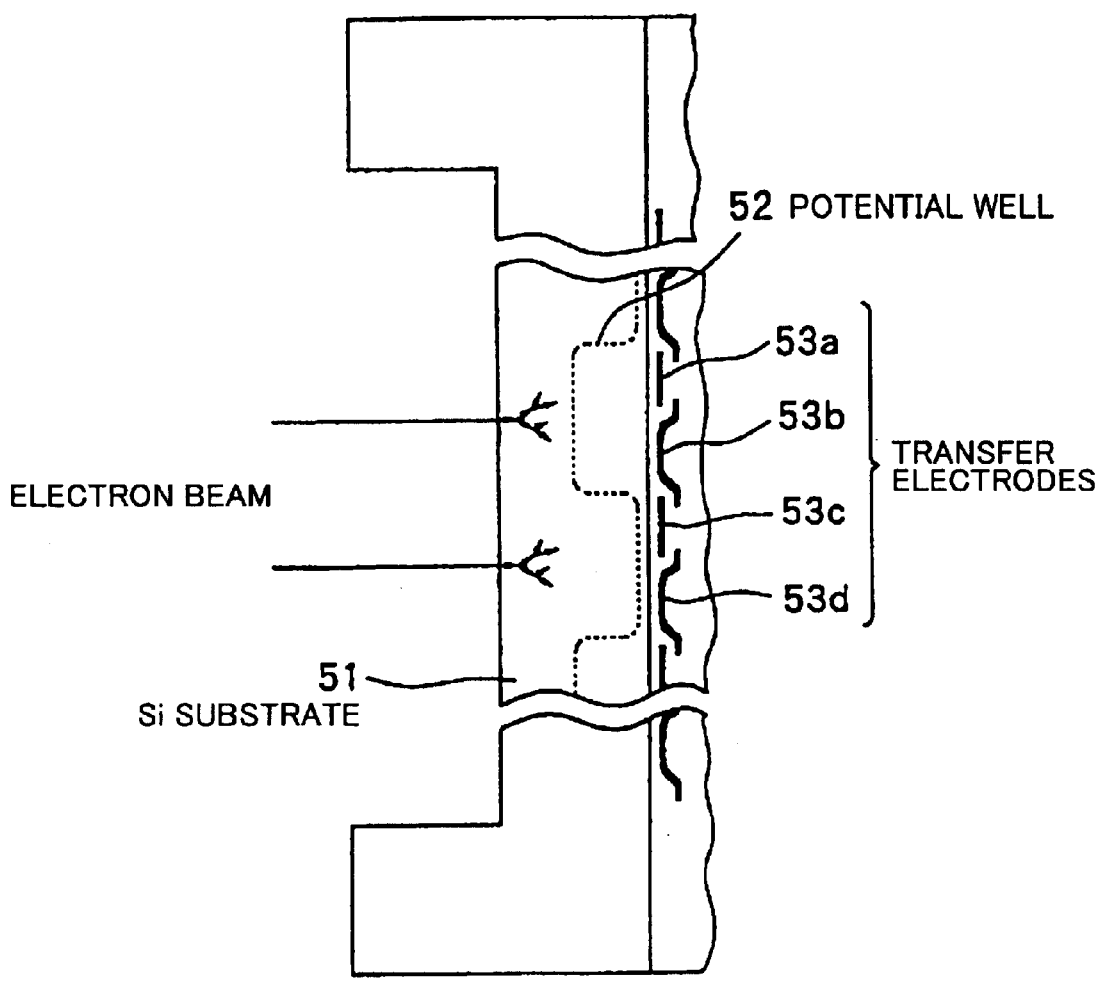

IMAGING APPARATUS

TECHNICAL FIELD

The present invention relates to an imaging apparatus for picking up images at low light levels, and more particularly to an imaging apparatus that uses an electron-bombarded multiplying tube with an internal charge-transfer solid imaging device.

BACKGROUND ART

Technology that uses, as an imaging device, an electron-bombarded multiplying tube with an internal charge-transfer solid imaging device, such as a CCD imaging device, is disclosed in "Electron-bombarded Back-illuminated CCD Sensors for Low Light Level Imaging Applications", SPIE Vol. 2415, pages 211–235, 1995 by G. M. Williams Jr. et al.

The above-noted publication discloses an imaging device with an internal Full Frame Transfer (FFT) CCD that uses almost the entire surface area of the CCD as the imaging region. In order to perform reading operations at television rates using an FFT CCD, incident light is blocked using a shutter, for example, during the vertical transfer period. Further, in order to match interlace scanning used in television, that is, in order to obtain image information corresponding to odd field image information, which is formed from image information from odd rows of television scan lines, and to obtain image information corresponding to even field image information, which is formed from image information from even rows of television scan lines, a horizontal transfer section combines image information in every two horizontal pixel rows of the CCD so that image information corresponding to the odd field and the even field can be alternately output.

Japanese Patent Publication (Rokoku) No. 60-30059 discloses technology that uses, as an imaging device, an electron-bombarded multiplying tube with an internal Frame Transfer (FT) CCD that is also capable of operating at television rates. FIG. 7 is a schematic view showing pixel formation by virtue of a CCD used in this technology. A transfer electrode 53 is formed in a surface opposite an incidence plane of an Si substrate 51. The transfer electrode 53 is configured from four electrodes 53a to 53d per one pixel. In order to perform the above-described interlace operations, a potential well 52 is formed below the transfer electrodes 53a, 53b during charge accumulation and retrieval of the even field and another potential well 52 is formed below the transfer electrodes 53c. 53d during charge accumulation and retrieval of the odd field, thereby performing quasi-interlace operations. Accordingly, the FT-CCD needs only half the number of pixels for the effective scanning lines.

However, the FFT-CCD disclosed by Williams Jr. et al requires incident light to be blocked during the transfer period. Therefore, the energy in light incident during this period cannot be used effectively. This is particularly a problem when incident light has a low intensity. When operating at television rates, accumulation time for imaging a single field is 1/60 seconds (17 ms) at maximum. However, this CCD requires about 12 ms to transfer one-field image. This leaves only about 5 ms for accumulating one-field image. This means that only about 30% of the incident light is used for accumulating the image. For this reason, sensitivity could not be increased. It is difficult to improve the transfer speed of the FFT-CCD while maintaining the S/N ratio and transfer efficiency at good levels, so there is a limit to how much the usage rate of light can be improved.

On the other hand, although the FT-CCD disclosed in Japanese Patent Publication No. 60-30059 has a signal usage rate of close to 100%, it has a disadvantage in that dark current of the CCD increases in association with electron beam irradiation. It is conceivable that this is because braking radiation X rays are generated at the electron incidence plane of the CCD when electrons emitted from the photocathode are accelerated to about 8 keV and irradiated onto the CCD, and that the X rays create an interface energy level at the silicon oxide film interface near the transfer electrode provided on the surface of the CCD.

As one method for reducing dark current in a CCD, U.S. Pat. No. 4,963,952 discloses a method of applying a voltage that is negative with respect to substrate potential, to the vertical transfer electrode during the signal accumulation period. However, the FT-CCD disclosed in the above-described Japanese Patent Publication No. 60-30059 applies a positive voltage to the gate electrode in the signal accumulation position during the accumulation period, in order to change accumulation position of the signal charge in each pixel when switching between the even and odd fields. Therefore, the PT-CCD of Japanese Patent Publication No. 60-30059 could not use the technology of U.S. Pat. No. 4,963,952. For this reason, the FT-CCD is greatly influenced by dark current resulting from X ray damage, and has a short life because of degradation caused by X rays at the interface. Also. CCD has only half the number of pixels in the vertical direction as a television scan line, so resolution was not sufficient.

In view of the foregoing, it is an object of the present invention to provide an imaging apparatus that uses an electron-bombarded multiplying tube with an internal solid imaging device with a long life, improved S/N ratio, high resolution, and moreover high sensitivity.

DISCLOSURE OF THE INVENTION

To achieve the above-described object, an imaging apparatus according to the present invention includes, as an imaging element, an electron-bombarded multiplying tube housing, in a vacuum vessel that partially transmits light, a photocathode that emits, in accordance with incident light, photo-electrons from a photo-electron emission surface opposite a light incidence plane, and a charge-transfer solid imaging device that is disposed in confrontation with the photo-electron emission surface of the photocathode and that detects spatial distribution of photoelectrons as an image using a plurality of pixels. The photocathode is applied with a voltage that is negative with respect to a substrate of the imaging device. The imaging apparatus is characterized in that the imaging device is configured from a plurality of pixels disposed in horizontal pixel rows in a main scanning direction, the horizontal pixel rows being disposed in a vertical direction that is orthogonal to the main scanning direction, in a number equal to or greater than a predetermined number of output scan lines, that the image device is configured from an imaging portion for multiplying and accumulating electrons falling incident on the pixels during an image accumulation period, and an accumulation portion for, during a successive horizontal transfer period, transferring to and accumulating in each corresponding pixel, charges accumulated in the imaging portion during the image accumulating period, and that a charge transfer electrode is formed on a surface opposite the photo-electron incidence plane on a substrate of the imaging device, and a voltage that is negative with respect to the substrate is applied to the transfer electrode of the imaging portion at least during the image accumulation period.

With this configuration, the back-illuminated FT solid imaging device is disposed in the vacuum vessel in confrontation with the photocathode. In the FT solid imaging device, charge accumulated during the image accumulation period can be transferred to the accumulation portion at a high speed during the charge transfer period. Therefore, the image accumulation period is sufficiently long. Also, a negative voltage is applied to the transfer electrode of the imaging portion during the image accumulation period. Therefore, dark current associated with incident brake radiation X rays can be reduced. Further, vertical resolution can be secured because the number of vertical pixels equal or exceed a predetermined number of output scan lines.

Further, the horizontal pixel rows are scanned sequentially in a vertical direction and an image signal that is equivalent to the accumulated charges at each pixel is output. A scan converter is further provided for converting the image signal into an interlace signal by alternately outputting one field at a time of only the odd rows or only the even rows of the horizontal pixel rows.

Alternatively, a horizontal transfer portion adds, at every other fields, an output signal for the 2n-th horizontal pixel row in the vertical direction to an output signal for the (2n−1)th or the (2n+1)th horizontal pixel row in alternation, wherein n is a natural number.

With this configuration, the imaging portion and the accumulation portion of the imaging device are provided with the same form as a sequentially-output-operation imaging device, and in addition convert the output signal for the imaging elements into an interlace signal.

On the other hand, it is desirable to further provide a frame memory for accumulating a single frame's worth of image signal from the imaging device, and a subtraction circuit for subtracting the output signal accumulated in the pixel frame memory from the corresponding output signal of the scan converter or the imaging device and outputting the result.

With this configuration, the difference between the pixel output accumulated in the frame memory and the output signal of the imaging device or the scan converter be easily obtained.

Further, it is desirable that the voltage value applied to the photocathode be 0V during the vertical transfer period, or be a negative voltage having an absolute value that is smaller than the voltage value applied during the image accumulation period.

With this configuration, the potential difference formed between the photoelectron incidence plane and the photocathode during the charge transfer period from the imaging portion to the accumulation portion of the imaging device is smaller than the potential difference during the image accumulation period. The acceleration of photo-electrons from the photocathode to the photo-electron incidence plane of the device is controlled during the charge transfer period, so that the energy of electrons that reach the photoelectron incidence plane of the device is reduced during the charge transfer period. Therefore, gain from collision of electrons can be reduced.

BRIEF DESCRIPTION OF THE DRAWINGS

FIG. 7 is a cross-sectional schematic view of a conventional FT-CCD internally housed in an electron-bombarded multiplying tube.

BEST MODE FOR CARRYING OUT THE INVENTION

A preferred embodiment of the present invention will be described with reference to the drawings.

Figure 1:
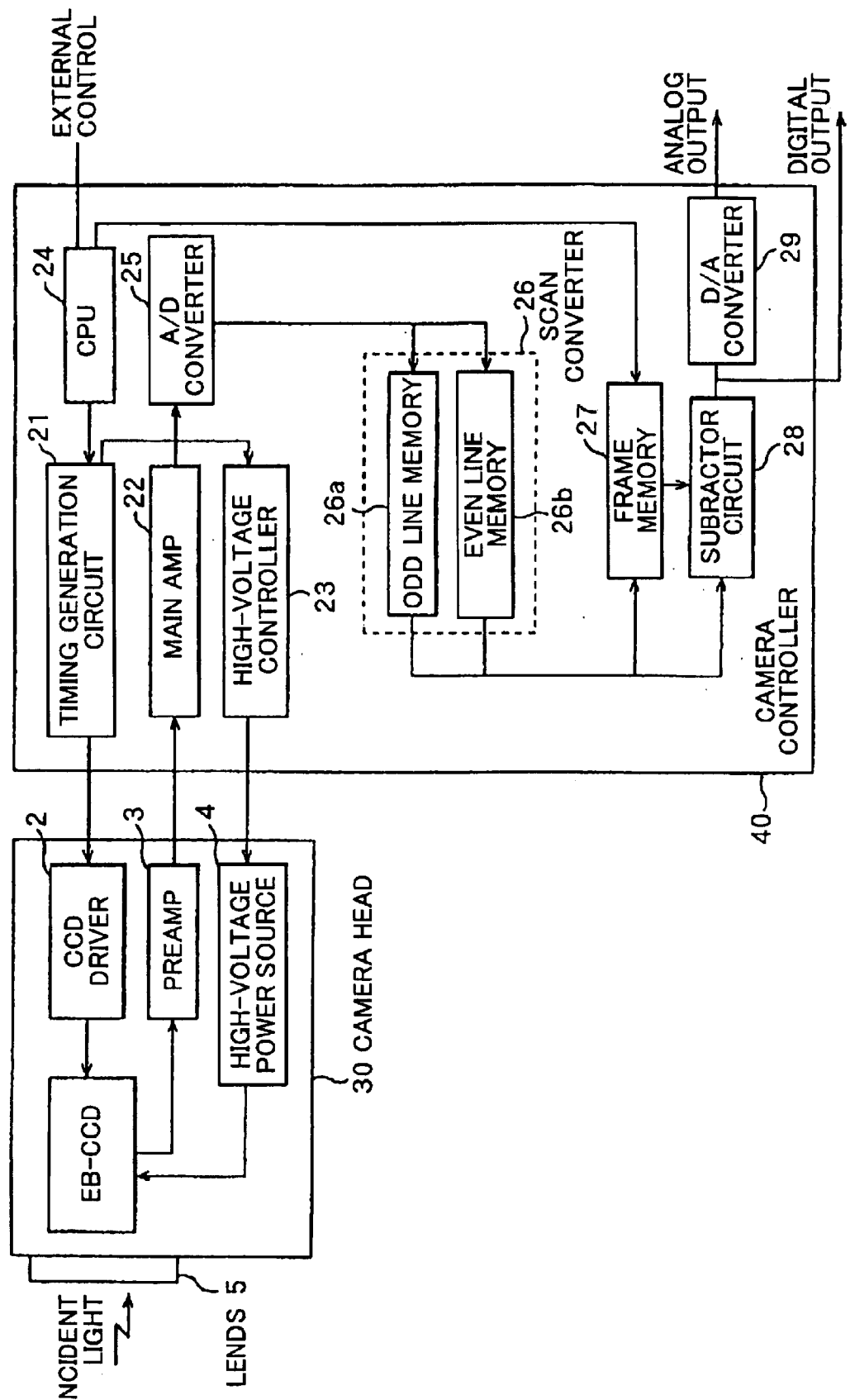
FIG. 1 is a block diagram of an imaging apparatus according to the present invention.

FIG. 1 is a block diagram of an imaging apparatus according to the present invention. The imaging apparatus includes a camera head 30 and a camera controller 40. The camera head 30 contains an electron-bombarded multiplying tube (EB-CCD) 1 as an imaging element. The EB-CCD 1 uses a CCD which is one of charge transfer type solid imaging devices. The camera controller 40 controls the EB-CCD 1 and the like.

In addition to the EB-CCD 1, the camera head 30 includes a CCD driver 2 for driving the EB-CCD 1, a pre-amplifier for amplifying output from the EB-CCD 1, and a high-voltage power source 4 for applying a high voltage to a photocathode 13 to be described later, which is provided in the EB-CCD 1. A lens 5 for focusing an optical image of an object to be photographed is disposed at the light incidence plane of the EB-CCD 1.

The camera controller 40 includes a timing generator circuit 21 for outputting a timing signal for controlling the CCD driver 2, a CPU 24 for controlling the timing generator circuit 21, a high-voltage controller 23 for controlling the high-voltage power source 4, a main amplifier 22 for amplifying output from the pre-amplifier 3, an A/D converter 25 for converting output from the main amplifier 22 into a digital signal, a scan converter 26 for converting the non-interlace signal which is the output from the A/D converter 25 into an interlace signal, a frame memory 27 for accumulating a single screen's worth of image output signal, a subtraction circuit 28 for subtracting the output signal accumulated in the frame memory 27 from the output signal from the scan converter 26, and a D/A converter 29 for converting the produced digital signal into an analog signal and outputting the resultant signal. The scan converter 26 includes an odd line memory 26a for accumulating only image information signals for odd scan line rows of image output from the A/D converter 25, and an even line memory 26b for accumulating only image information signals for even scan line rows of image output from the A/D converter 25.

Figure 2:
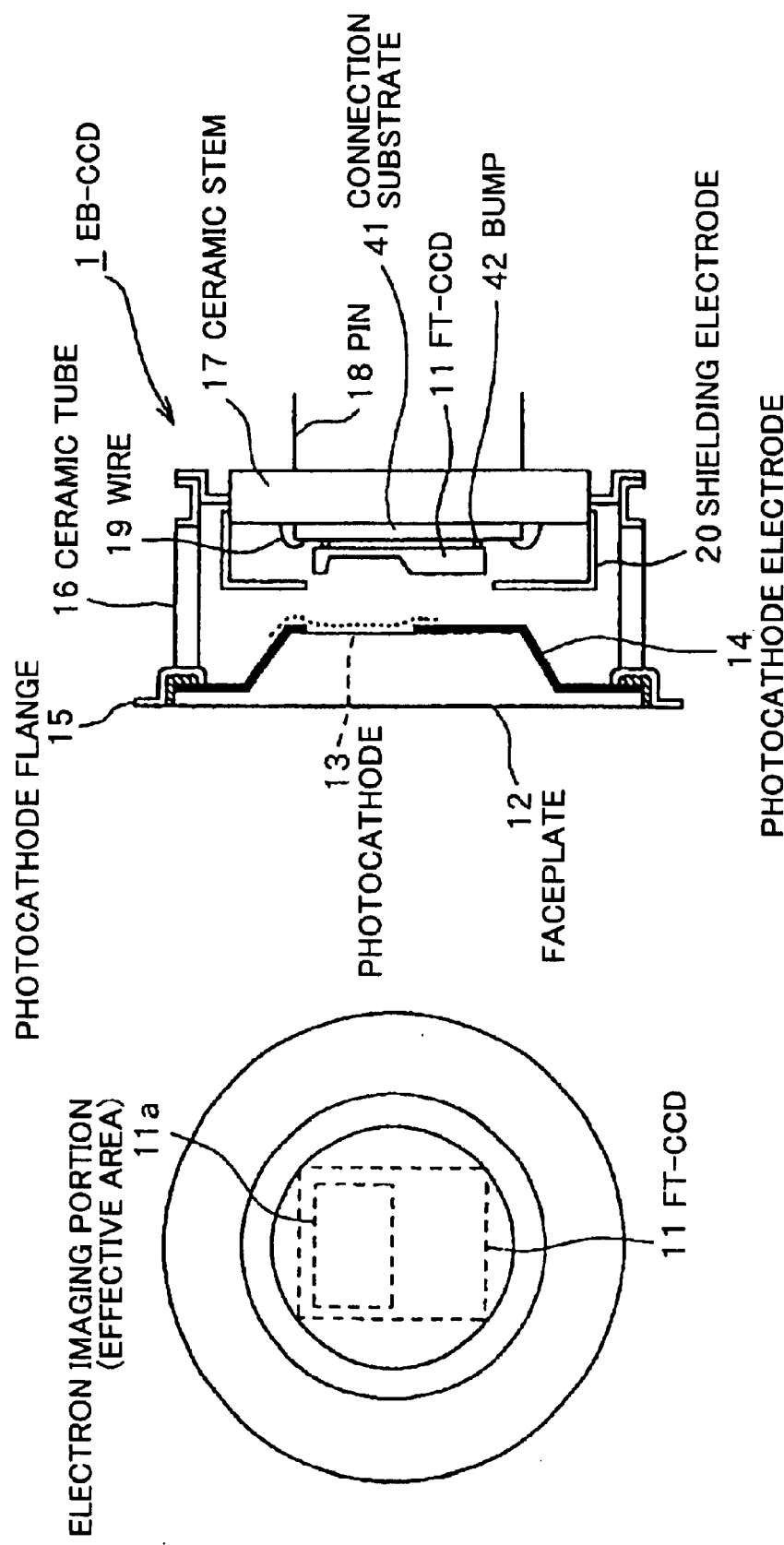
FIG. 2 is a schematic view of an EB-CCD, which is an imaging element of the imaging apparatus of FIG. 1.

FIG. 2 shows a schematic view of the EB-CCD 1 contained in the camera head 30. The EB-CCD 1 has a back-illuminated FT-CCD 11 inside. A faceplate 12 that transmits light is disposed at the incident side of the EB-CCD 1. A photocathode 13 for performing photoelectric conversion is formed to the inside of the faceplate 12 in confrontation with the incident side of an imaging portion 11a of the CCD 11. The photocathode 13 is formed by vapor deposition of material, such as Sb, Na, K, or Cs, in layers. The photocathode can also be formed by adhering a GaAsP crystal to the faceplate 12 in advance, and then performing vapor deposition of Cs in a vacuum on the GaAsP crystal. A photocathode electrode 14 is formed by vapor deposition of Cr, Ni, and Cu, in this order. The faceplate 12, a ceramic tube 16, and a ceramic stem 17 to which the CCD 11 is fixed form a vessel of the EB-CCD 1 that houses the CCD 11 and the photocathode 13. A vacuum condition is maintained in the interior of the vessel. A drive signal is applied to the CCD 11 through a bump 42, a wire 19, and a pin 18 that penetrates through the ceramic stem 17, and thus the output signal from the CCD 11 is obtained. The wire 9 and the bump 42 are electrically connected by aluminum wiring (not shown) formed on a connection substrate 41. A shielding electrode 20 is provided between the wire 19 and the photocathode electrode 14.

Figure 3:
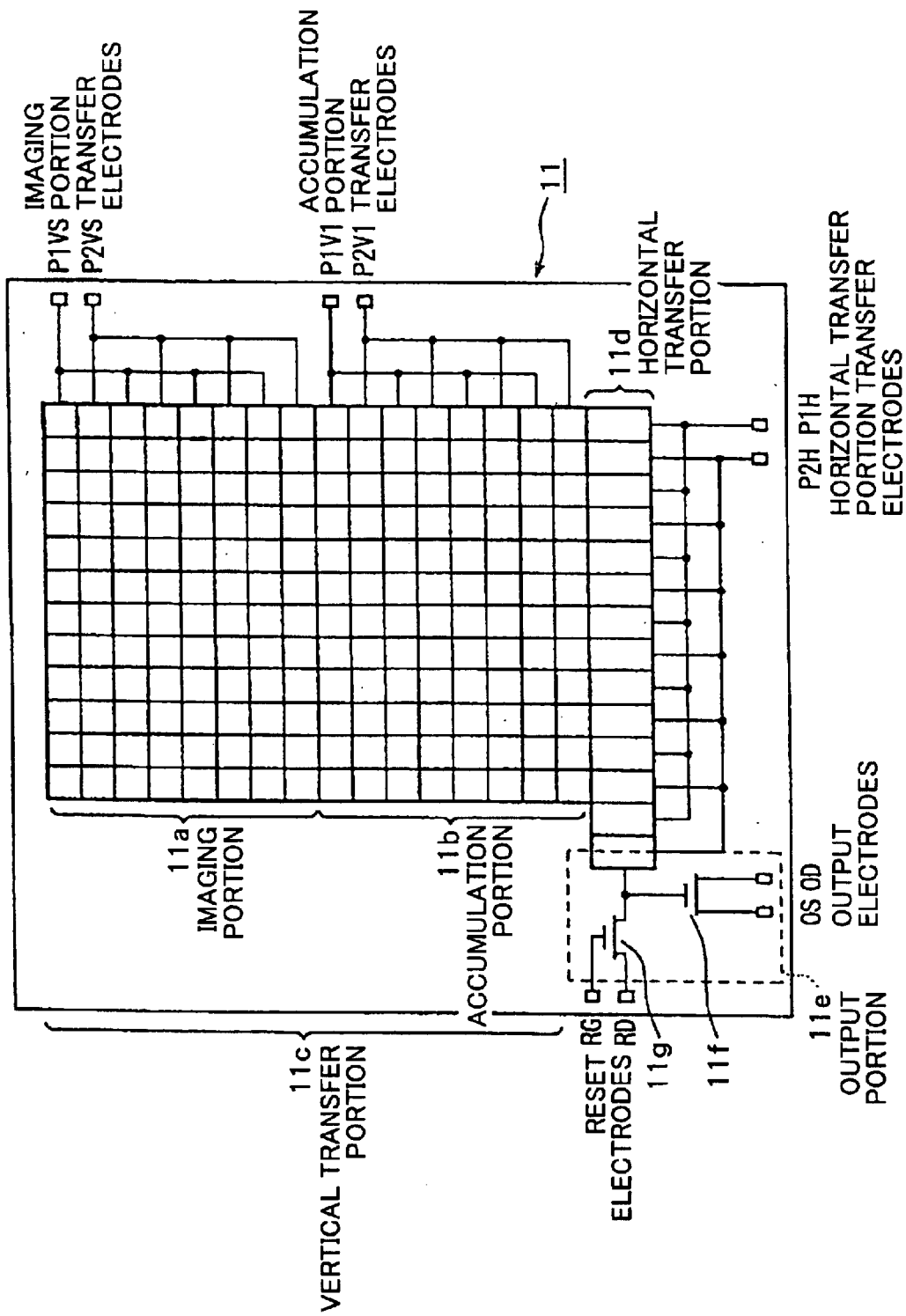
FIG. 3 is a schematic view of an FT-CCD of the EB-CCD of FIG. 2.

The CCD 11 is a buried channel CCD formed from a p-doped substrate used as a base and a n-doped layer formed on the surface on which the transfer electrode is formed, which surface being opposite from the electron incidence plane. The CCD 11 includes an imaging portion 11a and an accumulation portion 11b. The imaging portion 11a is reduced to a thin shape of about 20 $\mu$m by etching the rear surface, which is the incidence plane. The accumulation portion 11b is maintained to its original thickness, i.e., the thickness before etching, of about 300 $\mu$m. FIG. 3 is a schematic view showing pixels of the CCD 1.

As described above, the CCD 11 includes the imaging portion 11a and the accumulation portion 11b. There are 658 effective pixels in the horizontal direction (main scanning direction) and 490 in the vertical direction. FIG. 3 is drawn with the number of pixels abbreviated to simplify the drawing. A vertical transfer portion 11c is configured from the imaging portion 11a and the accumulation portion 11b. An output portion 11e is connected to the vertical transfer portion 11C through a horizontal transfer portion 11d. The output portion 11e has two FETse an output FET 11f and a reset FET 11g.

Operations of the imaging apparatus will be described. The imaging apparatus operates at the television rate of 30 Hz. The EB-CCD 1, which is an imaging element, performs non-interlace operations (sequential retrieval). Therefore, image accumulation and retrieval of accumulated charges are performed for each frame. Although about 33 ms is required to configure a single frame, of this time about 0.5 ms is used as a vertical transfer period, the remainder is purely the image accumulation period.

During the major portion of the image accumulation period, the photocathode 13 shown in FIG. 2 to applied with, a voltage of –8 kV by the photocathode electrode 14. This voltage is applied by the high-voltage controller 23 controlling the high-voltage power source 4, based on a timing signal from the timing generation circuit 21 shown in FIG. 1. The timing signal outputted from the timing generation circuit 21 is controlled by the CPU 24.

As shown in FIG. 2, when light is transmitted through the faceplate 12 and irradiated onto the photocathode 13, photo-electrons are emitted in accordance with the incident light from the surface opposite from the incidence plane of the photocathode 13, that is, from the surface in confrontation with the CCD 11. The substrate potential of the CCD 11 is maintained at 0V, so that an electric field develops between the substrate of the CCD 11 and the photocathode 13. The generated photo-electrons are accelerated by the electric field and collide on the incidence plane of the imaging portion 11a of the CCD 11. Because the photo-electrons are accelerated with 8 keV by the above-described electric field, about 1,500 electron/hole pairs are generated for every incident electron when kinetic energy is lost in the silicon substrate of the imaging portion 11a. The multiplied electrons generated in this manner move to the surface formed with the transfer electrode opposite from the incident plane, and reach the potential wells below the imaging portion 11a shown in FIG. 3.

The charges accumulated in the potential wells for each pixel during the image accumulation period are transferred to the accumulation portion 11b during a vertical transfer period, to be described in detail later. Afterward, the accumulated charges are sequentially outputted from the output portion 11e through the horizontal transfer portion 11d during the next image accumulation period. The output signal is retrieved from the pin 18 by a device external to the EB-CCD 1 through the wire 19 and the bump 42 shown in FIG. 2. Even if the multiplied electrons undesirably enter into the accumulation portion 11b during the image accumulation period, because the substrate of the accumulation portion 11b is thick compared to the imaging portion 11a as described above, almost all the multiplied electrons recombine near the rear surface (incident plane) of the substrate without reaching the transfer electrode portion of the accumulation portion 11b . Generation of noise can thus be suppressed to a minimum.

As shown in FIG. 1, the output signal retrieved in this way is transmitted from the EB-CCD 1, amplified by the pre-amplifier 3 and the main amplifier 22, then sent to the A/D converter 25 where it is converted into a digital signal and transmitted to the scan converter 26. The scan converter 26 performs conversion to an interlace signal by allocating pixel output signals that correspond to odd rows and even rows of television scan lines to the odd line memory 26a and the even line memory 26b respectively, and alternatingly outputting an even field signal, which is made from the pixel output signals from the odd lines, and an odd field signal, which is made form the pixel output signal of the odd lines.

The scan converter 26 need not use the above-described format. A variety of scan converters that convert a non-interlace signal to an interlace signal, such as a circuit using a delay circuit, can be used.

Before image pickup is performed, a single screen's worth (one frame) of image output signal is stored in the frame memory 27 under conditions with no incident light that is, under dark conditions. For each pixel, the subtraction circuit 28 subtracts the output signal stored under dark conditions from the output signal of the scan converter 26. By this the dark noise that is specific to the imaging element can be subtracted, and output can be achieved with a high S/N ratio.

The frame memory 27 can be updated when power of the camera controller 40 is turned on or by control from an external device through the CPU 24. Changes in dark condition output caused by changes in the imaging element over time can be coped with.

Output from the subtraction circuit 28 is converted into an analog signal at the D/A converter 29 and outputted. Also, the digital signal from the subtraction circuit 28 can be outputted a is 80 it can be processed by a computer.

Figure 4:
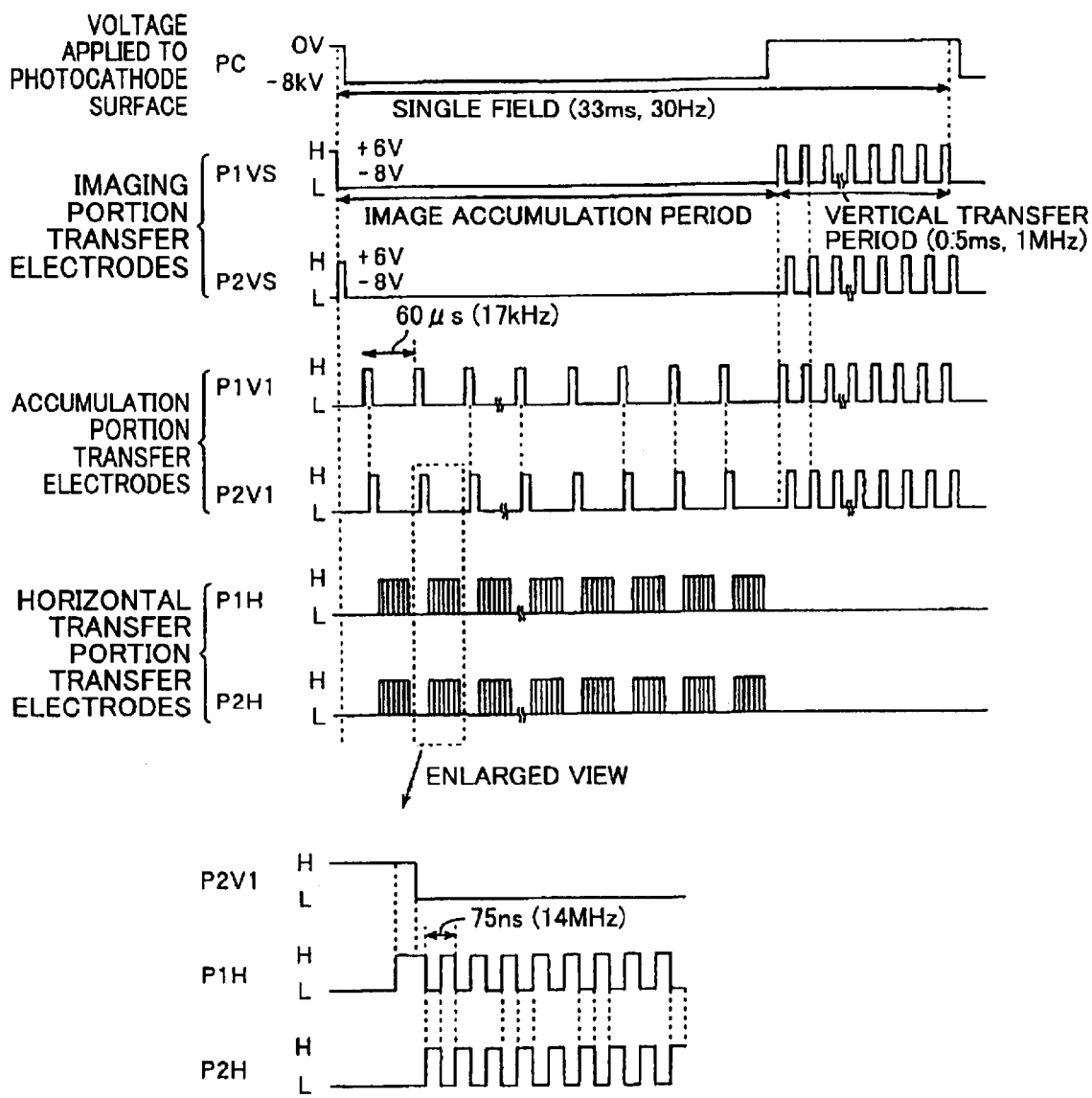
FIG. 4 is a timing chart for a method of driving the FT-CCD of FIG. 3.

Next, a method for driving the CCD 11 will be described in detail while referring to FIGS. 3 to 5. FIG. 4 is a timing chart of voltage applied to each transfer electrode in the CCD 11. FIG. 5 is a view schematically showing potential distribution in the silicon substrate in a conventional apparatus and in the present apparatus.

In the timing chart of FIG. 4, the high (H) level of the drive voltage at each transfer electrode is 6 V and the low (L) level is –8 V.

A negative L level voltage is applied to both transfer electrodes P1VS and P2VS of the imaging portion 11a during the image accumulation period. Because the potential of the silicon substrate is 0 V, the n-channel layer of the transfer electrode is brought to an inverse condition in which holes gather. Accordingly, the interface level of the silicon oxide film interface becomes filled with holes, so that the dark current originating from the interface energy levels, is greatly reduced.

During the vertical transfer period (0.5 ms) following the image accumulation period, charges accumulated at each pixel of the imaging portion 11a are transferred at a high speed to each pixel of the accumulation portion 11b. The vertical transfer is performed by cyclically applying a drive voltage at a frequency of 1 MHz (period is 1 microsecond) so that the transfer electrodes P1V1, P2V2 of the accumulation portion 11b and the transfer electrodes P1VS, P2VS of the image portion 11a are alternately at L levels and H levels. In this case also, it is desirable that the L level voltage, which forms the inverse condition that gathers holes in the n-channel layer, be applied as long as possible within a range where transfer efficiency is not degraded. That is it is desirable that the L level duration be longer than the H level duration in each period. During the vertical transfer period, the negative value of the voltage applied to the photocathode 13 is smaller than during the image accumulation period. Therefore, multiplication of electrons incident on the imaging portion is prevented during the vertical transfer period. Smears caused by unnecessary signals during transfer can be greatly improved. Although an application voltage of 0V is the most desirable, any voltage that does not generate gain at the photocathode, for example, −2 kV, can obtain the same effects. This case has the effect of reducing the amplitude of the voltage pulse applied to the photocathode to 6 kV.

Charges transmitted to the accumulation portion 11b in this way are retrieved by an external device from the accumulation portion 11b during the next image accumulation period. For this retrieval operation, H level and L level drive voltages are applied alternately to the transfer electrodes P1V1, P2V1 of the accumulation portion 11b. The interval for H level signals applied to the electrodes is about 60 microseconds (17 kHz). As a result, each period of 60 microseconds, one row's worth of charges accumulated in the horizontal pixel rows of the accumulation portion 11b are transmitted to the horizontal transfer portion 11d.

H level and L level drive voltages in inverse relation are cyclically applied at a period of about 7 ns (14 MHz) to the transfer electrodes P1H, P2H of the horizontal transfer portion 11d. In this way, charge accumulated for each single pixel is transferred to the output portion 11e. At the output portion 11e, a fixed voltage is applied to the drain OD of the output FET 11f, and a drain current adjusted in accordance with the pixel charge amounts transferred to the output portion 11e is output from the source OS. After retrieval of a single pixel is completed, the voltage applied to the gate RG of the reset FET 11g is Bet to an H level. The gate potential of the output FET 11f is fixed to the drain voltage RD of the reset PET 11g and reset. By repeating this, interlace retrieval that sequentially retrieves the charge accumulated for each pixel for each horizontal pixel row is performed.

Brake radiation X rays will always be generated when the accelerated electrons enter silicon and decelerate therein. These X rays damage the silicon oxide film interface, and increase dark current. The FT-CCO disclosed in Japanese Patent Publication No. 60-30059 applies a positive voltage to one of the vertical transfer electrodes. Accordingly, dark current caused by damage from brake radiation X rays to the silicon oxide film interface could not be avoided.

On the other hand, according to the present invention, all of the transfer electrodes of the image portion 11a are at an L level, that is, are applied with a negative voltage during image accumulation periods. Therefore, the interface level of the silioon oxide film interface is in a inverse condition and so filled with holes. Therefore, dark current caused by damage from brake radiation X rays will not be generated at all. Although an H level, that is a positive voltage, is applied during vertical transfer periods, it is only for a total of 0.25 ms or less during each single period. Because this period is shorter than the accumulation period by two decimal places or more, dark current increases by only an extremely slight amount during the vertical transfer period. In this way, according to the present invention dark current caused by X ray damage can be reduced by two decimal places or more than compared to the conventional situation. The life of the apparatus can be extended by this amount. Also, because the accumulation portion 11b has a thickness of about 300 micrometers, electrons are absorbed near the surface. Therefore, even if brake radiation X rays are generated, they will not reach to near the electrodes, so increases in dark current will not occur. Also, because there are twice the number of pixels in the horizontal direction than in the CCD of the former conventional technology, the resolution in the horizontal direction is improved.

Figure 5A:
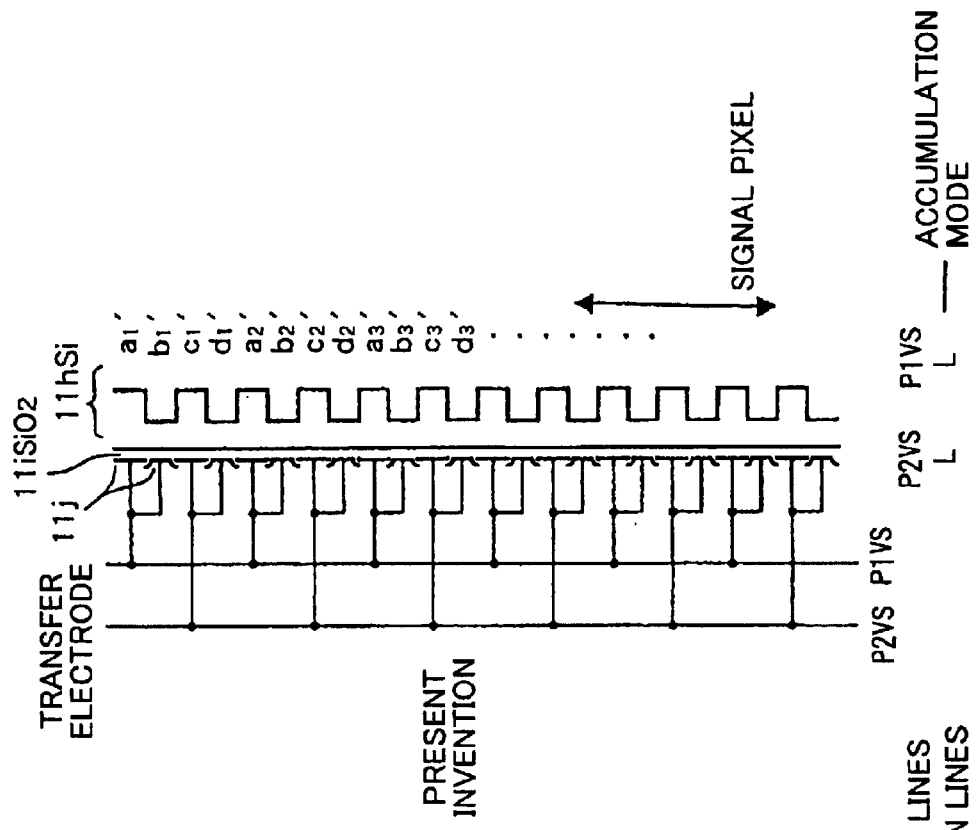
FIG. 5 is a schematic view comparing the form of potential wells in a conventional imaging portion and in an imaging portion according to the present invention.
Figure 5B:
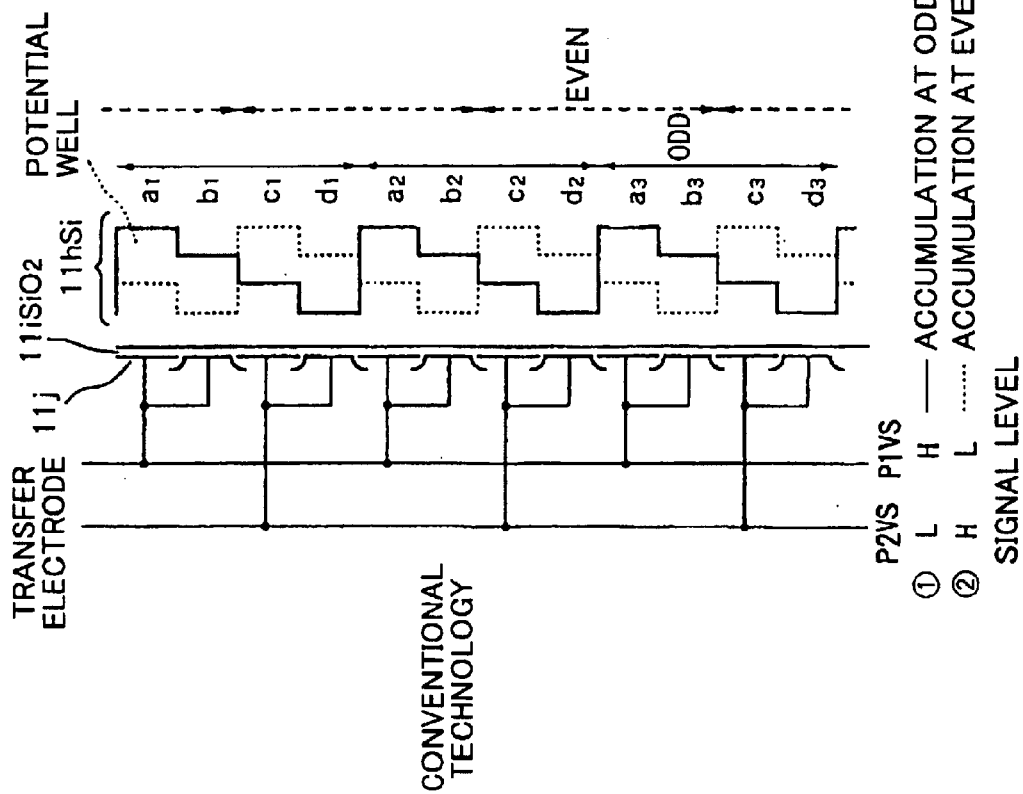

FIG. 5 is a view schematically showing a comparison of transfer electrodes in imaging portions of both the conventional CCD and the apparatus of the present invention, and potential wells generated by the transfer electrodes during charge accumulation. FIG. 5(a) shows the case of the conventional technology. The solid line indicates potential wells of the odd field during image accumulation, and dotted line indicates potential wells of the even field during image accumulation. FIG. 5(b) shows the case of the present invention. In both, a silicon oxide layer 11i is deposited on the silicon layer 11b which serves as a substrate. Also, a transfer electrode 11j is formed on the silicon oxide layer 11i. Electrodes $b_1$, $b_2$, $b_3$, . . . , electrodes $d_1$, $d_2$, $d_3$, . . . , electrodes $b_1'$, $b_2'$, $b_3'$, . . . , and electrodes $d_1'$, $d_2'$, $d_3'$, . . . , are doped with a thin p-impurity. Therefore, even if the same voltage is applied to the transfer electrodes a to d (a' to d'), the potential will be shallow compared to at the electrodes $a_1$, $a_2$, $a_3$, . . . , electrodes $c_1$, $c_2$, $c_3$, . . . , electrodes $a_1'$, $a_2'$, $a_3'$, . . . , and electrodes $c_1'$, $c_2'$, $c_3'$, . . . . In the conventional technology shown in FIG. 5(a), the vertical transfer portion imitates interlace operations using half the number of pixels in the vertical direction as the number of effective scan lines. Therefore, as described previously, during image accumulation for the odd field a potential well is used below a and b electrodes, but not below c and d electrodes. Contrarily, during image accumulation for the even field a potential well is used below the c and d electrodes, but not below the a and b electrodes. On the other hand, according to the present invention, vertical pixels are provided in the same number or more as the number of effective scan lines. Therefore, a potential well is always used below all of the a', b', c', and d' electrodes.

In this way, in conventional technology, potential wells are formed at positions that differ depending on the field. Therefore, application of an H level, that is, of a positive voltage, is required at the a and b transfer electrodes during image accumulation in the odd field and at the c and d transfer electrodes during image accumulation in the even fields. For this reason, as described previously, dark current caused by damage to the silicon oxide film interface by X rays could not be avoided. On the other hand, according to the present invention, an L level, that is, a negative voltage, can be applied to all transfer electrodes during image accumulation. Therefore, dark current caused by X ray damage can be avoided.

However, voltage at the transfer electrodes P1VS, P2VS of the imaging portion 11a is maintained at an L level during the image accumulation period, and the initial voltage distribution during the successive vertical transfer period set as per FIG. 5(a), then the effect of the present invention, of preventing dark current caused by X ray damage, can be achieved. When the present invention is worked in this way, then compared to the first embodiment the advantage of high vertical resolution is lost, but it is still possible to obtain a considerable resolution.

The present imaging apparatus uses a frame memory 27 and a subtraction circuit 28 (refer to FIG. 1), to obtain a high S/N ratio by subtracting dark current output from the image signal output, and outputting the result. Although, as described previously, the imaging apparatus controls generation of dark current caused by brake radiation X rays, dark current can not be reduced to zero. The remainder of the dark current can be effectively removed from the signal output by using the subtraction circuit 28.

Figure 6:
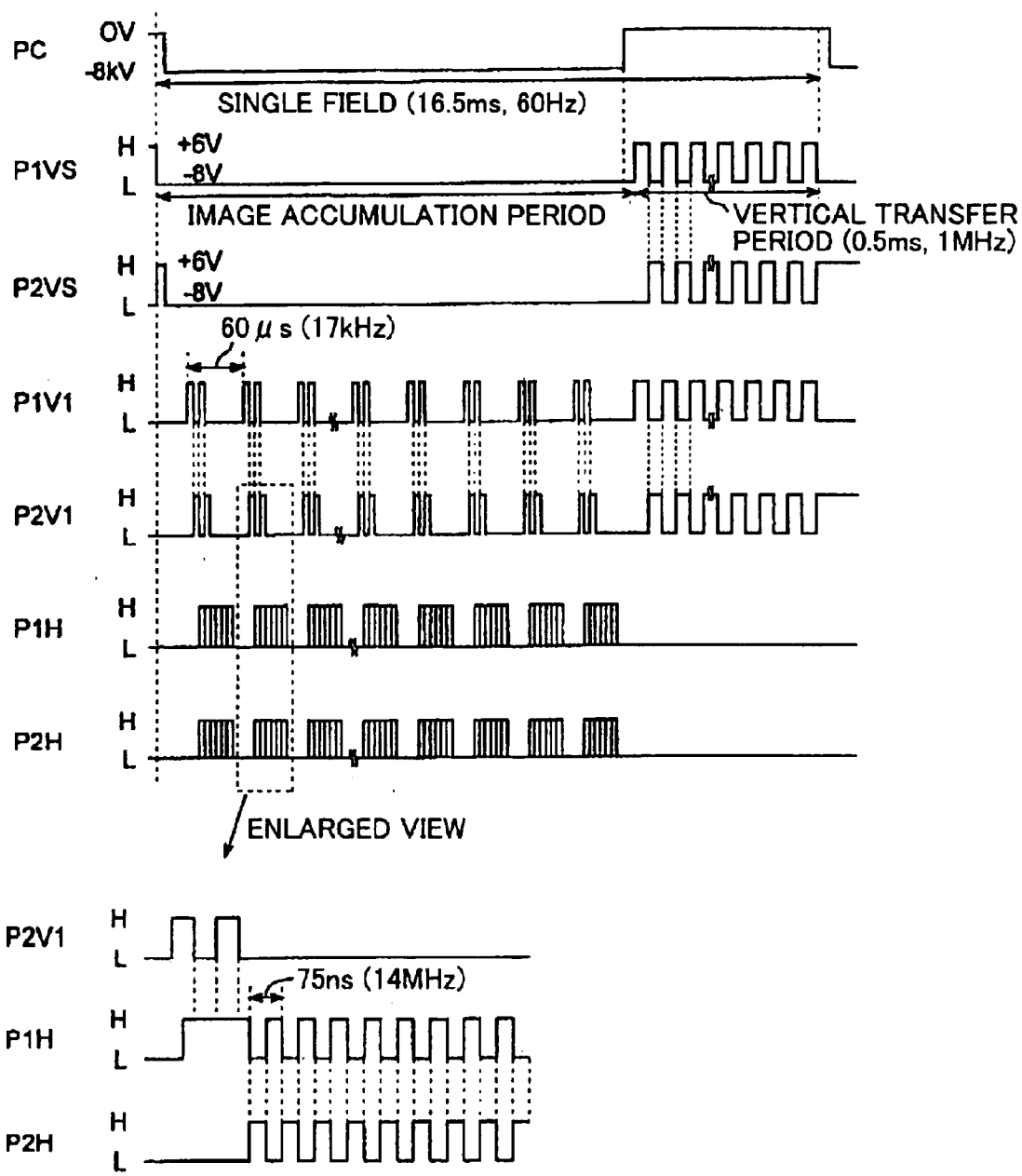
FIG. 6 is a timing chart for a method of driving an FT-CCD according to a second embodiment of the present invention.

Next, a second embodiment of the present invention will be described while referring to FIG. 6. This embodiment is characterized in that the horizontal transfer portion in the imaging element generates an interlace signal, instead of the scan converter converting an output signal to an interface signal. The configuration of the imaging apparatus is the configuration of the first embodiment shown in FIG. 1, with only the scan converter 26 removed. FIG. 6 shows a timing chart of the second embodiment. Here, explanation will be omitted for points that are redundant with the timing chart shown in FIG. 4 for the first embodiment.

In the second embodiment, image accumulation and vertical transfer are repeated for outputs of each of the odd and even field of a television screen. Accordingly, operation is repeated at a frequency of 60 Hz, about a 16.5 ms cycle, which is twice the frequency of the first embodiment. As shown in FIG. 6, drive voltage applied to the transfer electrodes P1VS and P2VS of the imaging portion is the same as in the first embodiment of FIG. 1.

In the first embodiment, the L level drive voltage is applied to the transfer electrodes P1V1 and P2V1 of the accumulation portion 11b and the transfer electrodes P1VS and P2VS of the imaging portion 11a for a longer period than the H level drive voltage. However, according to the second embodiment, as shown in FIG. 6 the L level and the H levels are repeatedly alternated so that while the transfer electrodes P1V1 (P1VS) are at the H level, the transfer electrodes P2V1 (P2VS) are at the L level, and contrarily, when the transfer electrodes P1V1 (P1VS) are at the L level, the transfer electrodes P2V1 (P2VS) are at the H level. That is, the drive voltage applied to the transfer electrodes P1V1 (P1VS) and P2V1 (P2VS) is applied so as not be simultaneously at the L level. This is because by repeatedly alternating the L and H levels, the full well is larger than compared to applying drive voltage so the L level is simultaneous. From this reason, in the first embodiment also, a drive voltage having the same wave form as in the second embodiment can be applied to the transfer electrodes P1V1 (P1VS) and P2V1 (P2VS).

Charge is transferred from the imaging portion to the accumulation portion for each single field. During the image accumulation period directly after transfer, the transferred charge is sent to the horizontal transfer portion 11d for every two rows of horizontal pixel rows, and charge addition is performed. At this time, during output of the odd field the first row is added to the second row, the third row is added to the fourth row, . . . , and the (2n−1)-th row is added to the 2n-th row (wherein n is a natural number), and during output of the even field the second row is added to the third row, the fourth row is added to the fifth row, and the 2n-th row is added to the (2n+1)-th row. By this, it is possible to convert into an interlace signal without the need to add a special circuit. Also, vertical resolution can be secured when converting into an interlace signal. Operations performed after transfer to the horizontal transfer portion are basically the same as in the CCD 1 of the first embodiment, so description will be omitted.

In the embodiments described above, embodiments were explained that output interlace signals. However, the present invention can be an apparatus that outputs a non-interlace signal. In this case, the scan converter 26 shown in the block diagram of FIG. 1 is removed, and the output signal from the A/D converter 25 is inputted directly into the frame memory 27 or into the subtraction circuit 28. Also, the drive of the CCD follows the timing chart shown in FIG. 4. A non-interlace signal output in this way can be inputted to and used in a computer.

According the present invention as described above, an electron-bombarded multiplying tube with an internal solid imaging device, such as a back-illuminated FT-CCD is used as an imaging element, and a negative voltage is constantly applied to the transfer electrodes of the imaging portion of the imaging element during the image accumulation period. Therefore, generation of dark current by brake radiation X rays can be prevented, and a high sensitivity can be ensured. Also, the apparatus has the same number of vertical pixels as the number of scan lines, 80 vertical resolution can be maintained.

Further, if an interlace output is obtained by a scan converter or by adding charges from adjacent horizontal pixel rows during horizontal transfer, image output to normal television is possible.

Also, an output signal of dark current is accumulated in the frame memory, and this output signal is subtracted from the image output. By this, dark current noise is removed, so that a high S/N ratio can be obtained.

Further, by reducing the negative voltage applied to the photocathode during charge transfer, photo-electrons that fall incident on the imaging device during charge transfer can be controlled, and a further improved S/N ratio can be obtained.

INDUSTRIAL APPLICABILITY

The imaging apparatus according to the present invention enables imaging under low light conditions and imaging with weak light, such as fluorescent light. Therefore, it can be used for microscope photography, and biological observation in the dark, and can also be applied to security devices and the like.

What is claimed is:

1. An imaging apparatus including, as an imaging element, an electron-bombarded multiplying tube housing, in a vacuum vessel that partially transmits light, a photocathode that emits, in accordance with incident light, photoelectrons from a photo-electron emission surface opposite a light incidence plane, and a charge-transfer solid imaging device that is disposed in confrontation with the photo-electron emission surface of the photocathode and that detects spatial distribution of photoelectrons as an image using a plurality of pixels, the photocathode being applied with a voltage that is negative with respect to a substrate of the imaging device, characterized in that:

the imaging device is configured from a plurality of pixels disposed in horizontal pixel rows in a main scanning direction, the horizontal pixel rows being disposed in a vertical direction that is orthogonal to the main scanning direction, in a number equal to or greater than a predetermined number of output scan lines; the imaging device is configured from an imaging portion for multiplying and accumulating electrons falling incident on the pixels during an image accumulation period, and an accumulation portion for during a successive horizontal transfer period, transferring to and accumulating in each corresponding pixel, charges accumulated in the imaging portion during the image accumulating period; and a charge transfer electrode is formed on a surface opposite the photo-electron incidence plane on a substrate of the imaging device and a voltage that is negative with respect to the substrate is applied to the transfer electrode of the imaging portion at least during the image accumulation period.

2. The imaging apparatus as claimed in claim 1, characterized in that the horizontal pixel rows are scanned sequentially in a vertical direction and an image signal that is equivalent to the accumulated charges at each pixel is output, and that a scan converter is further provided for converting the image signal into an interlace signal by alternately outputting one field at a time of only the odd rows or only the even rows of the horizontal pixel rows.

3. The imaging apparatus as claimed in claim 1, characterized in that a horizontal transfer portion adds at every other fields, an output signal for the 2n-th horizontal pixel row in the vertical direction to an output signal for the (2n−1)th or the (2n+1)th horizontal pixel row in alternation, wherein n is a natural number.

4. The imaging apparatus as claimed in claim 1, characterized in that the imaging apparatus further comprises a frame memory for accumulating a single frame's worth of image signal from the imaging device, and a subtraction circuit for subtracting the output signal accumulated in the pixel frame memory from the corresponding output signal of the scan converter or the imaging device and outputting the result.

5. The imaging apparatus as claimed in claim 1, characterized in that the voltage value applied to the photocathode is 0V during the vertical transfer period, or is a negative voltage having an absolute value that is smaller than the voltage value applied during the image accumulation period.

* * * * *